(12) United States Patent
Huhtasalo

(10) Patent No.: US 10,679,115 B2
(45) Date of Patent: *Jun. 9, 2020

(54) MULTI-FREQUENCY RADIO FREQUENCY IDENTIFICATION TAG

(71) Applicant: SMARTRAC TECHNOLOGY FLETCHER, INC., Fletcher, NC (US)

(72) Inventor: Lauri Johannes Huhtasalo, Bangkok (TH)

(73) Assignee: SMARTRAC TECHNOLOGY FLETCHER, INC., Fletcher, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,465

(22) Filed: Mar. 26, 2019

(65) Prior Publication Data
US 2019/0220724 A1    Jul. 18, 2019

Related U.S. Application Data

(63) Continuation of application No. 15/160,982, filed on May 20, 2016, now Pat. No. 10,339,436.
(Continued)

(51) Int. Cl.
*G08B 21/00* (2006.01)
*G06K 19/077* (2006.01)
(Continued)

(52) U.S. Cl.
CPC ... *G06K 19/07767* (2013.01); *G06K 19/0724* (2013.01); *G06K 19/0776* (2013.01);
(Continued)

(58) Field of Classification Search
CPC ......... G06K 19/0724; G06K 19/07767; G06K 19/0776; G06K 19/07786; G06K 19/07794; H04B 5/0062; H04B 5/0081
(Continued)

(56) References Cited

U.S. PATENT DOCUMENTS

| 4,268,834 A | 5/1981 | Henry |
| 5,337,063 A | 8/1994 | Takahira |

(Continued)

FOREIGN PATENT DOCUMENTS

| CN | 102332634 A | 1/2012 |
| DE | 19742126 A1 | 3/1999 |

(Continued)

OTHER PUBLICATIONS

Extended European Search Report issued in copending EP Application No. 16797416 dated Apr. 12, 2019 in 8 pages.
(Continued)

*Primary Examiner* — Mark S Rushing
(74) *Attorney, Agent, or Firm* — Quarles & Brady LLP

(57) ABSTRACT

Embodiments described herein provide various designs of multi-frequency radio frequency identification (RFID) tags which are compact in size and tamper-proofing. In one aspect, a proposed multi-frequency RFID tag includes both a high frequency (HF) subsystem and an ultra-high frequency (UHF) subsystem. The HF subsystem and the UHF subsystem share a common integrated circuit (IC) chip and a common substrate. The HF subsystem further includes a HF loop antenna coupled to the IC chip. The UHF subsystem further includes a coupling antenna electrically coupled to the IC chip but electrically isolated from the HF loop antenna. The UHF subsystem also includes an UHF antenna having a region for receiving the RFID module. When the RFID module is positioned within the receiving region of the UHF antenna, the UHF antenna is coupled to the IC chip in the RFID module via the coupling antenna, thereby forming the UHF subsystem.

20 Claims, 4 Drawing Sheets

Related U.S. Application Data

(60) Provisional application No. 62/165,167, filed on May 21, 2015.

(51) Int. Cl.
*G06K 19/07* (2006.01)
*H04B 5/00* (2006.01)

(52) U.S. Cl.
CPC . *G06K 19/07786* (2013.01); *G06K 19/07794* (2013.01); *H04B 5/0062* (2013.01); *H04B 5/0081* (2013.01)

(58) Field of Classification Search
USPC .................................................. 340/10.42
See application file for complete search history.

(56) References Cited

U.S. PATENT DOCUMENTS

| | | |
|---|---|---|
| 6,342,839 B1 | 1/2002 | Curkendall et al. |
| 6,378,774 B1 | 4/2002 | Emori et al. |
| 6,466,131 B1 | 10/2002 | Tuttle et al. |
| 6,522,308 B1 | 2/2003 | Mathieu |
| 7,091,860 B2 | 8/2006 | Martinez de Velasco Cortina et al. |
| 7,782,206 B2 | 8/2010 | Burnett et al. |
| 7,859,393 B2 | 12/2010 | Suzuki et al. |
| 8,350,673 B2 | 1/2013 | Nyalamadugu et al. |
| 8,710,960 B2 | 4/2014 | Nyalamadugu et al. |
| 9,098,790 B2 | 8/2015 | Nyalamadugu et al. |
| 2001/0048361 A1 | 12/2001 | Mays et al. |
| 2003/0016136 A1 | 1/2003 | Harvey |
| 2003/0116634 A1 | 6/2003 | Tanaka |
| 2003/0132301 A1 | 7/2003 | Selker |
| 2004/0188531 A1 | 9/2004 | Gengel et al. |
| 2005/0012616 A1 | 1/2005 | Forster et al. |
| 2005/0038736 A1 | 2/2005 | Saunders |
| 2005/0186904 A1 | 8/2005 | Kowalski et al. |
| 2005/0237198 A1 | 10/2005 | Waldner et al. |
| 2005/0242950 A1 | 11/2005 | Lindsay et al. |
| 2005/0242957 A1 | 11/2005 | Lindsay et al. |
| 2006/0054710 A1 | 3/2006 | Forster et al. |
| 2006/0132313 A1 | 6/2006 | Moskowitz |
| 2006/0145851 A1 | 7/2006 | Posamentier |
| 2007/0008140 A1 | 1/2007 | Saarisalo et al. |
| 2007/0069858 A1 | 3/2007 | Kubo |
| 2007/0075837 A1 | 4/2007 | Tuttle et al. |
| 2007/0109101 A1 | 5/2007 | Colby |
| 2007/0144662 A1 | 6/2007 | Armijo et al. |
| 2007/0200681 A1 | 8/2007 | Colby |
| 2007/0200682 A1 | 8/2007 | Colby |
| 2007/0210923 A1 | 9/2007 | Butler et al. |
| 2007/0279231 A1 | 12/2007 | Cheng et al. |
| 2007/0285246 A1 | 12/2007 | Koyama |
| 2007/0290856 A1 | 12/2007 | Martin |
| 2008/0084310 A1 | 4/2008 | Nikitin et al. |
| 2008/0147461 A1 | 6/2008 | Lee et al. |
| 2008/0211675 A1 | 9/2008 | Forster et al. |
| 2008/0238679 A1 | 10/2008 | Rofougaran et al. |
| 2008/0265039 A1 | 10/2008 | Skowronek et al. |
| 2008/0308641 A1 | 12/2008 | Finn |
| 2009/0096611 A1 | 4/2009 | Jones |
| 2009/0219158 A1 | 9/2009 | Nikitin et al. |
| 2009/0231139 A1 | 9/2009 | Heurtier |
| 2010/0079289 A1 | 4/2010 | Brandt et al. |
| 2010/0097280 A1 | 4/2010 | Zibres et al. |
| 2010/0123010 A1 | 5/2010 | Sakama |
| 2010/0230498 A1 | 9/2010 | Atherton |
| 2010/0283690 A1 | 11/2010 | Artigue et al. |
| 2010/0302012 A1 | 12/2010 | Roesner |
| 2011/0006959 A1 | 1/2011 | Menko et al. |
| 2011/0084888 A1 | 4/2011 | Nishioka et al. |
| 2011/0309931 A1 | 12/2011 | Rose |
| 2012/0161937 A1 | 6/2012 | Chen |
| 2012/0248929 A1 | 10/2012 | Fish et al. |
| 2013/0105584 A1 | 5/2013 | Forster |
| 2014/0351027 A1 | 11/2014 | Gravelle et al. |
| 2015/0077297 A1 | 3/2015 | Forster |

FOREIGN PATENT DOCUMENTS

| | | |
|---|---|---|
| EP | 1087332 A1 | 3/2001 |
| EP | 2056234 A2 | 5/2009 |
| FR | 2757952 B1 | 3/1999 |
| WO | 2012025787 A1 | 3/2012 |

OTHER PUBLICATIONS

International Search Report and Written Opinion issued in International Patent Application No. PCT/US2009/032840 dated May 26, 2009 (6 pages).

International Search Report and Written Opinion issued in International Patent Application No. PCT/US2016/045069 dated Oct. 21, 2016 (11 pages).

European Search Report issued in European Patent Application No. 09708616.9 dated May 9, 2011 (9 pages).

Petitioner's Reply to Patent Owner's Response, Inter Partes Review of U.S. Pat. No. 8,944,337, IPR Case No. IPR2016-01763, Paper No. 16, filing date Sep. 21, 2017, pp. 1-39.

Fischer Deposition Exhibit 1023—Annotated Excerpt from U.S. Pat. No. 8,944,337, Inter Partes Review of U.S. Pat. No. 8,944,337, IPR Case No. IPR2016-01763, Exhibit No. 1023, exhibit filing date Sep. 21, 2017, p. 1.

Petitioner's Opposition to Patent Owner's Contingent Motion to Amend, Inter Partes Review of U.S. Pat. No. 8,944,337, IPR Case No. IPR2016-01763, Paper No. 17, filing date Sep. 21, 2017, pp. 1-32.

Petitioner's Amended Appendix of Exhibits, Inter Partes Review of U.S. Pat. No. 8,944,337, IPR Case No. IPR2016-01763, Paper No. 18, filing date Sep. 21, 2017, pp. 1-5.

Fischer Deposition Exhibit 1021—Annotated Excerpt from U.S. Pat. No. 8,944,337, Inter Partes Review of U.S. Pat. No. 8,944,337, IPR Case No. IPR2016-01763, Exhibit No. 1021, exhibit filing date Sep. 21, 2017, p. 1.

Fischer Deposition Exhibit 1022—Annotated Excerpt from U.S. Pat. No. 8,944,337, Inter Partes Review of U.S. Pat. No. 8,944,337, IPR Case No. IPR2016-01763, Exhibit No. 1022, exhibit filing date Sep. 21, 2017, p. 1.

Fischer Deposition Exhibit 1026—Handwritten Diagram, Inter Partes Review of U.S. Pat. No. 8,944,337, IPR Case No. IPR2016-01763, Exhibit No. 1026, exhibit filing date Sep. 21, 2017, p. 1.

Instructables: Pull Out Birthday Card, Inter Partes Review of U.S. Pat. No. 8,944,337, IPR Case No. IPR2016-01763, Exhibit No. 1030, exhibit filing date Sep. 21, 2017, pp. 1-6.

Fischer Deposition Exhibit 1024—Annotated Excerpt from U.S. Pat. No. 8,944,337, Inter Partes Review of U.S. Pat. No. 8,944,337, IPR Case No. IPR2016-01763, Exhibit No. 1024, exhibit filing date Sep. 21, 2017, p. 1.

Fischer Deposition Exhibit 1025—U.S. Patent Application Publication No. US 201010283690 A1 to Artigue et al., Inter Partes Review of U.S. Pat. No. 8,944,337, IPR Case No. IPR2016-01763, Exhibit No. 1025, exhibit filing date Sep. 21, 2017, pp. 1-12.

Deposition of Jim Fischer, IPR Case No. 2016-01763, Sep. 8, 2017, Inter Partes Review of U.S. Pat. No. 8,944,337, IPR Case No. IPR2016-01763, Exhibit No. 1027, exhibit filing date Sep. 21, 2017, pp. 1-364.

Kaplan, Steven M., Excerpt from Wiley Electrical and Electronics Engineering Dictionary (2004), Inter Partes Review of U.S. Pat. No. 8,944,337, IPR Case No. IPR2016-01763, Exhibit No. 1028, exhibit filing date Sep. 21, 2017, pp. 1-4.

Excerpt from Merriam-Webster's Collegiate Dictionary (10th ed. 2002), Inter Partes Review of U.S. Pat. No. 8,944,337, IPR Case No. IPR2016-01763, Exhibit No. 1029, exhibit filing date Sep. 21, 2017, pp. 1-8.

Declaration of Bruce Roesner in Support of Petitioner's Opposition to Patent Owner's Contingent Motion to Amend, Inter Partes

(56) References Cited

OTHER PUBLICATIONS

Review of U.S. Pat. No. 8,944,337, IPR Case No. IPR2016-01763, Exhibit No. 1031, exhibit filing date Sep. 21, 2017, pp. 1-35.
U.S. Pat. No. 9,582,746, to Mullis et al., Inter Partes Review of U.S. Pat. No. 8,944,337, IPR Case No. IPR2016-01763, Exhibit No. 1032, exhibit filing date Sep. 21, 2017, pp. 1-17.
Kraus, John D., Excerpts from Antennas 2nd Ed., Inter Partes Review of U.S. Pat. No. 8,944,337, IPR Case No. IPR2016-01763, Exhibit No. 2051, exhibit filing date Oct. 19, 2017, pp. 1-8.
Keyrouz et al., Novel Empirical Equations to Calculate the Impedance of a Strip Dipole Antenna, Dec. 2013, Inter Partes Review of U.S. Pat. No. 8,944,337, IPR Case No. IPR2016-01763, Exhibit No. 2046, exhibit filing date Oct. 19, 2017, pp. 1-4.
Jamaluddin et al., Microstrip Dipole Antenna Analysis with Different Width and Length at 2.4 GHz, Dec. 2005, Inter Partes Review of U.S. Pat. No. 8,944,337, IPR Case No. IPR2016-01763, Exhibit No. 2047, exhibit filing date Oct. 19, 2017, pp. 1-4.
Pozar, David M., Excerpts from Microwave Engineering 4th Ed., Inter Partes Review of U.S. Pat. No. 8,944,337, IPR Case No. IPR2016-01763, Exhibit No. 2052, exhibit filing date Oct. 19, 2017, pp. 1-3.
Reply to Petitioner's Opposition to Contingent Motion to Amend, Inter Partes Review of U.S. Pat. No. 8,944,337, IPR Case No. IPR2016-01763, Paper No. 20, filing date Oct. 19, 2017, pp. 1-19.
Supplemental Fischer Declaration ISO PO's Motion to Amend, Inter Partes Review of U.S. Pat. No. 8,944,337, IPR Case No. IPR2016-01763, Exhibit No. 2044, exhibit filing date Oct. 19, 2017, pp. 1-36.
Petitioner's Sur-Reply to Patent Owner's Reply to Petitioner's Opposition to Patent Owner's Contingent Motion to Amend, Inter Partes Review of U.S. Pat. No. 8,944,337, IPR Case No. IPR2016-01763, Paper No. 31, filing date Nov. 17, 2017, pp. 1-18.
Fischer Deposition Exhibit 1035A: Model, Inter Partes Review of U.S. Pat. No. 8,944,337, IPR Case No. IPR2016-01763, Exhibit No. 1035A, exhibit filing date Nov. 17, 2017, p. 1.
Declaration of Bruce Roesner, Inter Partes Review of U.S. Pat. No. 8,944,337, IPR Case No. IPR2016-01763, Exhibit No. 1049, exhibit filing date Nov. 17, 2017, pp. 1-93.
Boylestad, Robert L., Excerpt from Introductory Circuit Analysis, 2007, Inter Partes Review of U.S. Pat. No. 8,944,337, IPR Case No. IPR2016-01763, Exhibit No. 1053, exhibit filing date Nov. 17, 2017, pp. 1-4.
Stein, Jess (Editor), Excerpt from the Random House Dictionary of the English Language, 1966, Inter Partes Review of U.S. Pat. No. 8,944,337, IPR Case No. IPR2016-01763, Exhibit No. 1050, exhibit filing date Nov. 17, 2017, pp. 1-5.
U.S. Pat. No. 6,121,544, to Petsinger (issued Sep. 19, 2000), Inter Partes Review of U.S. Pat. No. 8,944,337, IPR Case No. IPR2016-01763, Exhibit No. 1051, exhibit filing date Nov. 17, 2017, pp. 1-16.
U.S. Pat. No. 8,604,995, to Hammad (issued Dec. 10, 2013), Inter Partes Review of U.S. Pat. No. 8,944,337, IPR Case No. IPR2016-01763, Exhibit No. 1052, exhibit filing date Nov. 17, 2017, pp. 1-15.
Balanis, Constantine A., Excerpts from Antenna Theory, Inter Partes Review of U.S. Pat. No. 8,944,337, IPR Case No. IPR2016-01763, Exhibit No. 2056, exhibit filing date Dec. 6, 2017, pp. 1-4.
Petitioner's Motion to Exclude, Inter Partes Review of U.S. Pat. No. 8,944,337, IPR Case No. IPR2016-01763, Paper No. 38, filing date Dec. 6, 2017, pp. 1-14.
Lehpamer, Harvey, Excerpts from RFID Design Principles, Inter Partes Review of U.S. Pat. No. 8,944,337, IPR Case No. IPR2016-01763, Exhibit No. 2057, exhibit filing date Dec. 6, 2017, pp. 1-14.
Finkenzeller, Klaus, Excerpts from RFID Handbook, Inter Partes Review of U.S. Pat. No. 8,944,337, IPR Case No. IPR2016-01763, Exhibit No. 2058, exhibit filing date Dec. 6, 2017, pp. 1-24.
International Search Report and Written Opinion for PCT/US2016/033636, dated Aug. 30, 2016 (13 pages).
Extended European Search Report for European Patent Application No. 16797416.1, dated Apr. 12, 2019, 8 pages.
PCT International Publication No. 20081074050 A1, to Peter Samuel Atherton, Inter Partes Review of U.S. Pat. No. 8,944,337, IPR Case No. IPR2016-01763, Exhibit No. 1006, exhibit filing date Sep. 9, 2016, pp. 1-21.
Declaration of Bruce Roesner in Support of Petition, Inter Partes Review of U.S. Pat. No. 8,944,337, IPR Case No. IPR2016-01763, Exhibit No. 1001, exhibit filing date Sep. 9, 2016, pp. 1-89.
U.S. Pat. No. 8,944,337, to Mullis et al., Inter Partes Review of U.S. Pat. No. 8,944,337, IPR Case No. IPR2016-01763, Exhibit No. 1004, exhibit filing date Sep. 9, 2016, pp. 1-17.
U.S. Pat. No. 7,460,018, to Yuki Kubo, issued Dec. 2, 2008, Inter Partes Review of U.S. Pat. No. 8,944,337, IPR Case No. IPR2016-01763, Exhibit No. 1007, exhibit filing date Sep. 9, 2016, pp. 1-13.
U.S. Patent Application Publication No. 2007/0290858, to Janke et al., Inter Partes Review of U.S. Pat. No. 8,944,337, IPR Case No. IPR2016-01763, Exhibit No. 1008, exhibit filing date Sep. 9, 2016, pp. 1-5.
U.S. Pat. No. 8,350,673, to Nyalamadugu et al., issued Jan. 8, 2013, Inter Partes Review of U.S. Pat. No. 8,944,337, IPR Case No. IPR2016-01763, Exhibit No. 1012, exhibit filing date Sep. 9, 2016, pp. 1-9.
U.S. Pat. No. 674,284, to G.A. Sachs, issued May 14, 1901, Inter Partes Review of U.S. Pat. No. 8,944,337, IPR Case No. IPR2016-01763, Exhibit No. 1015, exhibit filing date Sep. 9, 2016, pp. 1-6.
U.S. Patent Application Publication No. 2007/0144662, to Armijo et al., Inter Partes Review of U.S. Pat. No. 8,944,337, IPR Case No. IPR2016-01763, Exhibit No. 1016, exhibit filing date Sep. 9, 2016, pp. 1-13.
U.S. Pat. No. 7,361,251, to Green et al., issued Apr. 22, 2008, Inter Partes Review of U.S. Pat. No. 8,944,337, IPR Case No. IPR2016-01763, Exhibit No. 1017, exhibit filing date Sep. 9, 2016, pp. 1-28.
U.S. Patent Application Publication No. 2010/0302012, to Bruce B. Roesner, Inter Partes Review of U.S. Pat. No. 8,944,337, IPR Case No. IPR2016-01763, Exhibit No. 1009, exhibit filing date Sep. 9, 2016, pp. 1-14.
Excerpt from '337 file history: Apr. 4, 2014 Non-Final Rejection, Inter Partes Review of U.S. Pat. No. 8,944,337, IPR Case No. IPR2016-01763, Exhibit No. 1010, exhibit filing date Sep. 9, 2016, pp. 1-5.
Excerpt from '337 file history: Nov. 4, 2014 Response After Final Action, Inter Partes Review of U.S. Pat. No. 8,944,337, IPR Case No. IPR2016-01763, Exhibit No. 1011, exhibit filing date Sep. 9, 2016, pp. 1-9.
U.S. Pat. No. 7,571,694, to Rick Boerner, issued Aug. 11, 2009, Inter Partes Review of U.S. Pat. No. 8,944,337, IPR Case No. IPR2016-01763, Exhibit No. 1013, exhibit filing date Sep. 9, 2016, pp. 1-22.
European Patent No. 2230174, to Yoshizaki, issued Sep. 22, 2010, Inter Partes Review of U.S. Pat. No. 8,944,337, IPR Case No. IPR2016-01763, Exhibit No. 1014, exhibit filing date Sep. 9, 2016, pp. 1-23.
U.S. Pat. No. 7,120,987, to Peikang Liu et al., issued Oct. 17, 2006, Inter Partes Review of U.S. Pat. No. 8,944,337, IPR Case No. IPR2016-01763, Exhibit No. 1018, exhibit filing date Sep. 9, 2016, pp. 1-15.
Excerpt from '337 file history: Nov. 14, 2014 Notice of Allowance, Inter Partes Review of U.S. Pat. No. 8,944,337, IPR Case No. IPR2016-01763, Exhibit No. 1019, exhibit filing date Sep. 9, 2016, pp. 1-8.
U.S. Patent Application Publication No. 2010/0283690, to Artigue et al., Inter Partes Review of U.S. Pat. No. 8,944,337, IPR Case No. IPR2016-01763, Exhibit No. 1020, exhibit filing date Sep. 9, 2016, pp. 1-12.
Petition, Inter Partes Review of U.S. Pat. No. 8,944,337, IPR Case No. IPR2016-01763, Paper No. 1, filing date Sep. 9, 2016, pp. 1-87.
Preliminary Response, Inter Partes Review of U.S. Pat. No. 8,944,337, IPR Case No. IPR2016-01763, Paper No. 7, filing date Dec. 22, 2016, pp. 1-62.
U.S. Patent Application Publication No. 2004/0242285 A1, to Farshi, Pub. Date Dec. 2, 2004, Inter Partes Review of U.S. Pat. No. 8,944,337, IPR Case No. IPR2016-01763, Exhibit No. 2006, exhibit filing date Dec. 22, 2016, pp. 1-9.

(56) References Cited

OTHER PUBLICATIONS

Reference Designer Chapter 4.1 Impedance of Capacitor 2009, Inter Partes Review of U.S. Pat. No. 8,944,337, IPR Case No. IPR2016-01763, Exhibit No. 2009, exhibit filing date Dec. 22, 2016, pp. 1-2.
Fischer Declaration ISO Patent Owners Preliminary Response, Inter Partes Review of U.S. Pat. No. 8,944,337, IPR Case No. IPR2016-01763, Exhibit No. 2002, exhibit filing date Dec. 22, 2016, pp. 1-124.
PCT International Publication No. 2003/079487 A1, to Roshchupkin, Inter Partes Review of U.S. Pat. No. 8,944,337, IPR Case No. IPR2016-01763, Exhibit No. 2003, exhibit filing date Dec. 22, 2016, pp. 1-38.
Poynting, Universal Modem-to-Antenna Adaptor, Inter Partes Review of U.S. Pat. No. 8,944,337, IPR Case No. IPR2016-01763, Exhibit No. 2004, exhibit filing date Dec. 22, 2016, pp. 1-2.
U.S. Pat. No. 7,437,148 B1, to Vaghi et al., issued Oct. 14 2008, Inter Partes Review of U.S. Pat. No. 8,944,337, IPR Case No. IPR2016-01763, Exhibit No. 2005, exhibit filing date Dec. 22, 2016, pp. 1-28.
U.S. Pat. No. 5,659,324, to Taniguchi et al., issued Aug. 19, 1997, Inter Partes Review of U.S. Pat. No. 8,944,337, IPR Case No. IPR2016-01763, Exhibit No. 2007, exhibit filing date Dec. 22, 2016, pp. 1-79.
Lee et al., Designing Antenna Booster Cases for Mobile Phones using Capacitive Coupling Techniques 2015, Inter Partes Review of U.S. Pat. No. 8,944,337, IPR Case No. IPR2016-01763, Exhibit No. 2008, exhibit filing date Dec. 22, 2016, pp. 1-2.
Reference Designer Chapter 4.1 Parallel Plate Capacitor 2009, Inter Partes Review of U.S. Pat. No. 8,944,337, IPR Case No. IPR2016-01763, Exhibit No. 2010, exhibit filing date Dec. 22, 2016, p. 1.
Finkenzeller, RFID Handbook Fundamentals and Applications in Contactless Smart Cards and Identification, 2nd Ed. 1999 Copyright pages and Chapters 2-4, Inter Partes Review of U.S. Pat. No. 8,944,337, IPR Case No. IPR2016-01763, Exhibit No. 2011, exhibit filing date Dec. 22, 2016, pp. 1-154.
U.S. Pat. No. 8,416,079 B2, to Roesner, issued on Apr. 9, 2013, Inter Partes Review of U.S. Pat. No. 8,944,337, IPR Case No. IPR2016-01763, Exhibit No. 2012, exhibit filing date Dec. 22, 2016, pp. 1-18.
Response to IPR, Inter Partes Review of U.S. Pat. No. 8,944,337, IPR Case No. IPR2016-01763, Paper No. 12, filing date Jun. 21, 2017, pp. 1-63.
PCT International Publication No. 2008/074050 A1, to Peter Samuel Atherton, Inter Partes Review of U.S. Pat. No. 8,944,337, IPR Case No. IPR2016-01763, Exhibit No. 2014, exhibit filing date Jun. 21, 2017, pp. 1-21.
Malmstadt et al., Electronics for Scientists: Principles and Experiments for Those Who Use Instruments, Inter Partes Review of U.S. Pat. No. 8,944,337, IPR Case No. IPR2016-01763, Exhibit No. 2019, exhibit filing date Jun. 21, 2017, pp. 1-3.
Boylestad, Introductory Circuit Analysis, Inter Partes Review of U.S. Pat. No. 8,944,337, IPR Case No. IPR2016-01763, Exhibit No. 2020, exhibit filing date Jun. 21, 2017, pp. 1-3.
Holt et al., Physics 1999, Inter Partes Review of U.S. Pat. No. 8,944,337, IPR Case No. IPR2016-01763, Exhibit No. 2032, exhibit filing date Jun. 21, 2017, pp. 1-4.
Glossary of RFID Terms May 22, 2013, Inter Partes Review of U.S. Pat. No. 8,944,337, IPR Case No. IPR2016-01763, Exhibit No. 2033, exhibit filing date Jun. 21, 2017, pp. 1-3.
EPC based RFID Item Level Tagging, Inter Partes Review of U.S. Pat. No. 8,944,337, IPR Case No. IPR2016-01763, Exhibit No. 2013, exhibit filing date Jun. 21, 2017, pp. 1-56.
Clifford, How to Read Circuit Diagrams and Electronic Graphs, Inter Partes Review of U.S. Pat. No. 8,944,337, IPR Case No. IPR2016-01763, Exhibit No. 2015, exhibit filing date Jun. 21, 2017, pp. 1-8.
Boylestad, Introductory Circuit Analysis, Inter Partes Review of U.S. Pat. No. 8,944,337, IPR Case No. IPR2016-01763, Exhibit No. 2016, exhibit filing date Jun. 21, 2017, pp. 1-3.
Johnson et al., Introductory Electric Circuit Analysis, Inter Partes Review of U.S. Pat. No. 8,944,337, IPR Case No. IPR2016-01763, Exhibit No. 2018, exhibit filing date Jun. 21, 2017, pp. 1-12.
Fischer Declaration ISO Patent Owners Response to Petition, Inter Partes Review of U.S. Pat. No. 8,944,337, IPR Case No. IPR2016-01763, Exhibit No. 2028, exhibit filing date Jun. 21, 2017, pp. 1-87.
Mazda, F.F., Discrete Electronics Components, 1981, Inter Partes Review of U.S. Pat. No. 8,944,337, IPR Case No. IPR2016-01763, Exhibit No. 2031, exhibit filing date Jun. 21, 2017, pp. 1-11.
Motion to Amend Claims, Inter Partes Review of U.S. Pat. No. 8,944,337, IPR Case No. IPR2016-01763, Paper No. 13, filing date Jun. 21, 2017, pp. 1-35.
586 Application, to Mullis et al., Inter Partes Review of U.S. Pat. No. 8,944,337, IPR Case No. IPR2016-01763, Exhibit No. 2023, exhibit filing date Jun. 21, 2017, pp. 1-17.
372 Application, to Mullis et al., Inter Partes Review of U.S. Pat. No. 8,944,337, IPR Case No. IPR2016-01763, Exhibit No. 2024, exhibit filing date Jun. 21, 2017, pp. 1-20.
U.S. Patent Application Publication No. 2012/0280045 A1, to Mullis et al., Inter Partes Review of U.S. Pat. No. 8,944,337, IPR Case No. IPR2016-01763, Exhibit No. 2025, exhibit filing date Jun. 21, 2017, pp. 1-17.
U.S. Patent Application Publication No. 2014/0175177 A1, to Mullis et al., Inter Partes Review of U.S. Pat. No. 8,944,337, IPR Case No. IPR2016-01763, Exhibit No. 2026, exhibit filing date Jun. 21, 2017, pp. 1-16.
U.S. Pat. No. 7,782,206 B2, to Burnett et al., Inter Partes Review of U.S. Pat. No. 8,944,337, IPR Case No. IPR2016-01763, Exhibit No. 2021, exhibit filing date Jun. 21, 2017, pp. 1-10.
U.S. Patent Application Publication No. 2005/0134461 A1, to Gelbman et al., Inter Partes Review of U.S. Pat. No. 8,944,337, IPR Case No. IPR2016-01763, Exhibit No. 2022, exhibit filing date Jun. 21, 2017, pp. 1-27.
Fischer Declaration ISO Patent Owners Contingent Motion to Amend Claims, Inter Partes Review of U.S. Pat. No. 8,944,337, IPR Case No. IPR2016-01763, Exhibit No. 2029, exhibit filing date Jun. 21, 2017, pp. 1-51.

MULTI-FREQUENCY RADIO FREQUENCY IDENTIFICATION TAG

CROSS-REFERENCE TO RELATED APPLICATIONS

This application is a continuation of U.S. patent application Ser. No. 15/160,982, entitled "MULTI-FREQUENCY RADIO FREQUENCY IDENTIFICATION TAG," filed, May 20, 2016, which claims priority to U.S. Provisional Patent Application No. 62/165,167 entitled "MULTI-FREQUENCY RADIO FREQUENCY IDENTIFICATION TAG" filed on May 21, 2015, the contents of which are hereby incorporated by reference in their entirety as a part of this document.

BACKGROUND

Technical Field

This embodiments described herein generally relate to radio frequency identification (RFID) systems and more particularly to the design and manufacturing of dual-frequency RFID tags.

Related Art

RFID technology harnesses electromagnetic fields to transfer data wirelessly. One of the primary uses for RFID technology is the automatic identification and tracking of objects via RFID tags, which may be attached or incorporated into a variety of objects. Examples include credit cards, passports, license plates, identity cards, cellphones/mobile devices, etc. RFID technology also has applications in numerous areas, including, but not limited to, electronic tolling, parking access, border control, payment processing, asset management, and transportation. Thus, for example, a license plate that includes an RFID tag may be used for the purposes of electronic toll collection (ETC), electronic vehicle registration (EVR), border crossing etc.

An RFID tag can be configured to provide multiple operating frequencies in order to be used in a wider range of applications. For example, a dual-frequency RFID tag can support both high frequencies (e.g., 13.56 megahertz (MHz)) and ultra-high frequencies (e.g., 915 MHz or 2.45 gigahertz (GHz)). Ultra-high frequency (UHF) RFID systems can typically provide a greater read distances than high frequency (HF) RFID systems (e.g., near field communication (NFC) systems). Meanwhile, HF RFID systems tend to exhibit greater field penetration than UHF RFID systems.

SUMMARY

The embodiments described herein relate to multi-frequency RFID implementations that can be used in a variety of applications in a variety of situations.

One aspect of the disclosure provides a multi-frequency radio frequency identification (RFID) tag. The multi-frequency RFID tag can have a RFID module configured to be physically removed from the RFID tag. The RFID module can have an integrated circuit (IC) chip. The RFID module can have a first antenna coupled to the IC chip and formed of conductive ink, the first antenna being operable in a first frequency range. The RFID module can have a coupling antenna coupled to the IC chip. The multi-frequency RFID tag can have a second antenna formed of conductive ink and communicatively coupled to the IC chip via wireless coupling to the coupling antenna and configured to operate in a second frequency range.

Another aspect of the disclosure provides a multi-frequency radio frequency identification (RFID) tag. The multi-frequency RFID tag can have a removable chip module, physically removable from the RFID tag, the removable chip module having, The removable chip module can have a substrate. The removable chip module can have a digital control unit. The removable chip module can have a high-frequency (HF) antenna coil printed on the substrate and communicatively coupled to the digital control unit. The removable chip module can have an ultra-high frequency (UHF) coupling loop electrically coupled to the digital control unit. The multi-frequency RFID tag can have a UHF antenna communicatively coupled to the digital control unit via inductive coupling to the UHF coupling loop.

Another aspect of the disclosure provides a removable multi-frequency radio frequency identification (RFID) module. The removable multi-frequency RFID module can have a substrate. The removable multi-frequency RFID module can have an integrated circuit (IC) chip disposed on the substrate. The removable multi-frequency RFID module can have a high frequency (HF) antenna electrically coupled to the IC chip and formed of conductive ink on the substrate. The removable multi-frequency RFID module can have a coupling antenna electrically formed of conductive ink and coupled to the IC chip and disposed on the substrate, the coupling antenna being operable to inductively couple the IC chip to a second antenna of an antenna assembly configured to receive the removable multi-frequency RFID module, the second antenna being operable in an ultra-high frequency (UHF) range.

Other benefits and advantages will be apparent with a review of the following description.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

While certain embodiments are described below, these embodiments are presented by way of example only, and are not intended to limit the scope of protection. The methods and systems described herein can be embodied in a variety of other forms. Furthermore, various omissions, substitutions, and changes to the embodiments described herein, while still achieving the functionality described.

The embodiments described herein provide various designs of multi-frequency radio frequency identification (RFID) tags and modules that are compact in size, can be portable, can be used in multiple applications, and that can provide tamper-proofing capability. Certain embodiments of the multi-frequency tags described herein can include both a high frequency (HF) subsystem and an ultra-high frequency (UHF) subsystem. The HF subsystem and the UHF subsystem can share a common integrated circuit (IC) chip and a common substrate. The HF subsystem can further include a HF loop antenna coupled to the IC chip. The UHF subsystem can further include a coupling antenna electrically coupled to the IC chip but electrically isolated from the HF loop antenna. Moreover, the HF loop antenna and the coupling antenna can form a nested structure, and as such, the substrate, the IC chip, the HF loop antenna and the coupling antenna form a compact RFID module. The UHF subsystem can also include an UHF antenna having a region, such as an aperture to receive the RFID module. When the RFID module is positioned in the aperture of the UHF antenna, the UHF antenna is then coupled to the IC chip in the RFID module via the coupling antenna, thereby forming the UHF subsystem. However, when the RFID module is removed from the aperture of the UHF antenna, the UHF subsystem is rendered inoperable.

In certain other embodiments, the UHF subsystem can simply comprise the UHF antenna coupled with the IC.

It should be noted that while particular embodiments of RFID modules and tags are described herein, the RFID functionality described can be incorporated into other forms and devices. For example, a dual frequency RFID module can be in the form of a card or a rectangular module, or even a mobile device.

Figure 1:
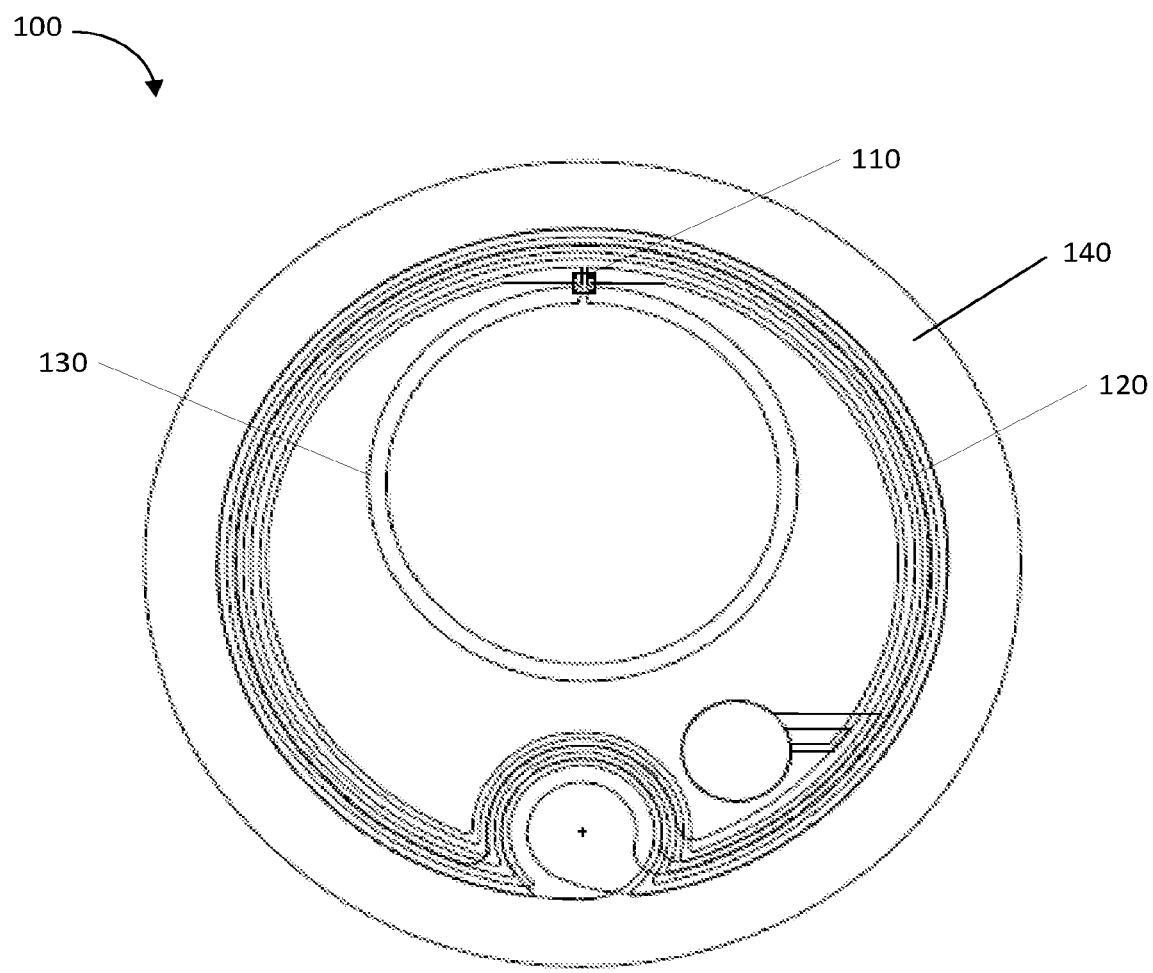
FIG. 1 shows a top-view illustration of an exemplary multi-frequency radio frequency identification (RFID) module in accordance with some embodiments described herein.

FIG. 1 shows a top-view illustration of an exemplary multi-frequency radio frequency identification (RFID) module 100 in accordance with one embodiment described herein. As illustrated in FIG. 1, the multi-frequency RFID module 100 includes an integrated circuit (IC) chip 110 (or "chip 110" hereinafter), a high frequency (HF) antenna 120, and an UHF loop 130. Chip 110 can include a memory (not shown) and other circuits. A more detailed embodiment of chip 110 is provided below in conjunction with FIG. 2.

Multi-frequency RFID module 100 can also include a substrate 140, which provides structural supports for chip 110, HF antenna 120 and UHF loop 130. In various embodiments, chip 110, HF antenna 120 and UHF loop 130 can be deposited or fabricated on substrate 140. In the embodiment of multi-frequency RFID module 100, UHF antenna 130 can, as illustrated in FIG. 1, be positioned substantially inside the loops of HF antenna 120. In some embodiments, HF antenna 120 is tuned to operate at a desired high frequency, such as 13.56 MHz. Tuning of HF antenna 120 can be achieved in conjunction with chip 110, which is described in more detail below with respect to FIG. 2. UHF loop 130 can also be tuned to operate at a desired ultra-high frequency, such as 915 MHz or 2.45 GHz. In certain embodiments, UHF loop 130 can be an UHF antenna by itself and thus form a UHF sub-system with chip 110. In other embodiments, UHF loop 130 can be implemented as a coupling means for coupling chip 110 to a separate UHF antenna. One embodiment in which chip 110 is coupled to an external UHF antenna via UHF loop 130 is provided below in conjunction with FIG. 3.

In the exemplary embodiment shown in FIG. 1, HF antenna 120 is configured as a loop antenna that includes multiple circular loops; however, in other embodiments, HF antenna 120 can be constructed with non-circular-shaped loops, such as rectangular loops. Similarly, while the loops in UHF loop 130 are shown to be circular, UHF loop 130 can also be constructed with non-circular-shaped loops, such as rectangular loops without departing from the scope of the present inventive concept. Further, while UHF loop 130 is shown to include two circular loops in the example of FIG. 1, in other embodiments, UHF loop 130 can include a single loop or more than two loops.

In some embodiments, chip 110 of multi-frequency RFID module 100 can be frequency-independent. For example, chip 110 can be configured to interface with both HF (e.g., NFC) and UHF systems. Thus, chip 110 can perform functions associated with both HF and UHF systems including, but not limited to, encoding/decoding, modulation/demodulation, digital and analog processing, and data storage. Although multi-frequency RFID module 100 uses a single IC chip 110 for operating with different frequencies, more than one IC chip can be used to implement functions associated with systems operating at different frequencies.

In various embodiments, HF antenna 120 can be coupled to chip 110 to form a HF sub-system. HF antenna 120 can be tuned to operate in a HF range (e.g., at 13.56 MHz). According to one exemplary embodiment, HF antenna 120 can be coupled to chip 110 using a bridging technique. In some embodiments, HF antenna 120 is constructed from etched aluminum. Hence, HF antenna 120 can be connected to chip 110 by crimping through layers (e.g., aluminum) of the HF antenna 120 and chip 110.

In some embodiments, HF antenna 120 can be coupled to chip 110 by depositing (e.g., printing) dielectric and conductive inks over the HF antenna 120. For example, coils or loops that form antenna 120 can be constructed using conductive ink. The ends of the HF antenna 120 can be connected with chip 110 using dielectric ink deposited over the inner coils to prevent short-circuiting while conductive ink can be deposited over the dielectric ink to create a jumper over the dielectric ink to connect the outer coils to the chip 110.

UHF loop 130 can also be coupled to chip 110. According to one exemplary embodiment, UHF loop 130 can be positioned inside the HF antenna 120. In this nested configuration, multi-frequency RFID module 100 can be more physically compact and require a smaller aperture in a corresponding external antenna as will be described in more details below in conjunction with FIG. 3. Moreover, because multi-frequency RFID module 100 also has a circular-shaped substrate 140 to support circular-shaped HF and UHF antennas 120 and 130, the overall construction of RFID module 100 provides a highly compact RFID system. In certain embodiments, HF antenna 120 can be positioned inside of the UHF loop 130.

Figure 2:
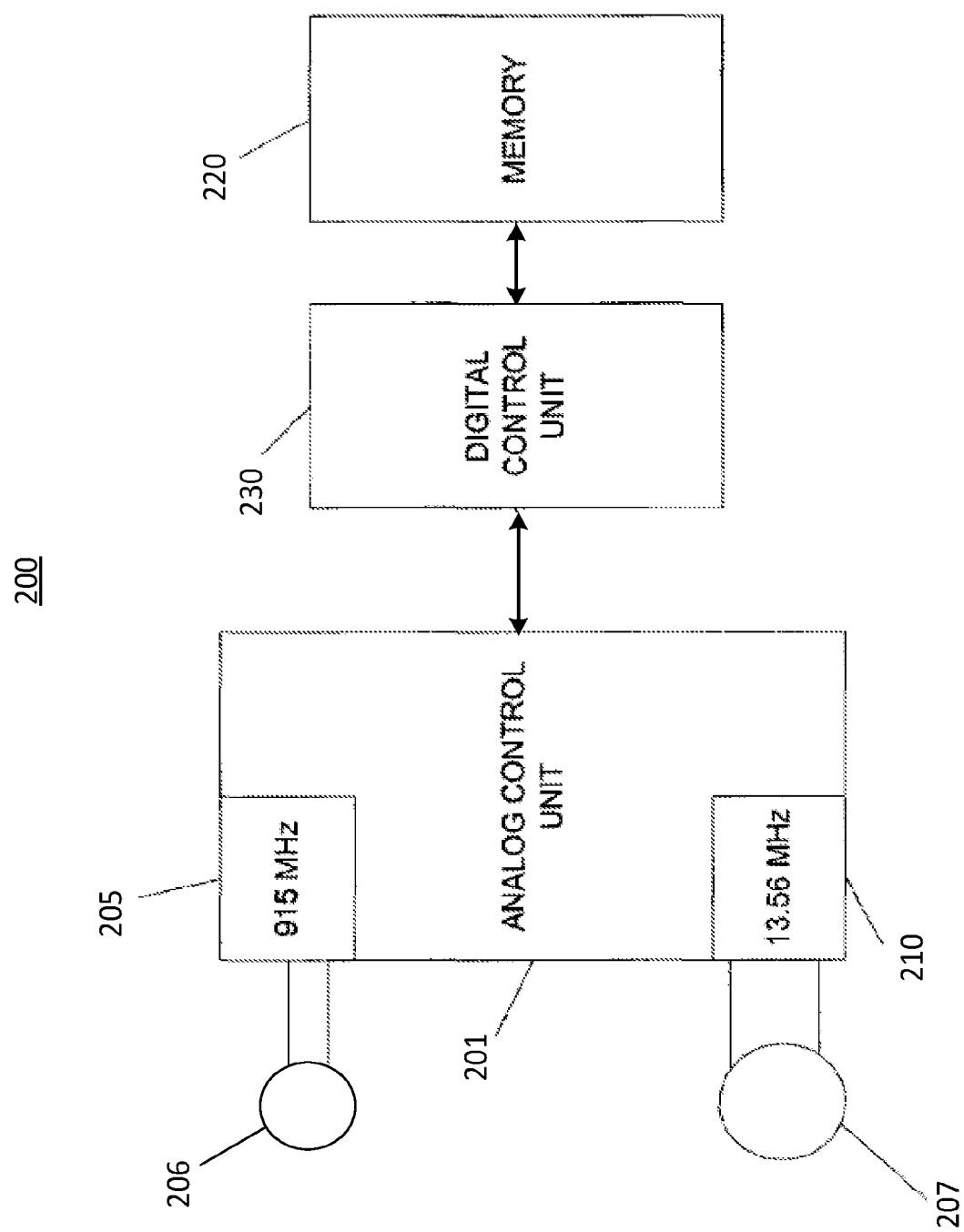
FIG. 2 shows a block diagram of a chip structure which is an exemplary implementation of the RFID chip described in FIG. 1 in accordance with some embodiments described herein.

FIG. 2 shows a block diagram of a chip 200, which is an exemplary implementation of chip 110 described in FIG. 1 in accordance with one embodiment described herein. This example is used merely to illustrate the architectural overview of an exemplary embodiment of chip 110.

As can be seen in FIG. 2, chip comprises a radio front end that includes an analog control unit 201 that can comprise an HF interface 210 and a UHF interface 205, which can interface with antenna 207 and 206 respectively. Interfaces 210 and 205 can include the matching that allows the front end to be tuned for operation at both HF, e.g., 13.56 MHz and UHF, e.g., 915 MHZ or 2.45 GHz, respectively. In some embodiments, the UHF interface 205 is used, for example, for a data reading function that enables high data rate. In one embodiment, the UHF interface 205 is coupled to a UHF loop 206 as described above in conjunction with FIG. 1. In some embodiments, the HF interface 210 is used for the writing (e.g., personalization) of identification information into the memory of chip 200. In one embodiment, the HF interface 210 is coupled to a coil antenna 207 (e.g., a wound spiral of insulated wire) as described above in conjunction with FIG. 1.

In one embodiment, the chip 200 can be a frequency-independent chip. In this case, a single manufactured silicon chip, when properly connected and matched to an appropriate antenna, will operate at any of the relevant frequencies assigned for the dual-frequency interface, comprising interfaces 205 and 210 and analog control unit 201. In other embodiments, chip 200 can also be a one-frequency or multi-frequency chip. In these cases, the chip is uniquely designed and characterized to operate with a specific antenna at one or a few specific frequencies.

Chip 200 can also include a digital or baseband portion that includes a memory 220 and a digital control unit 230 coupled between the analog control unit 201 and memory 220. Digital control unit 230 can include circuits to perform functions such as A/D conversion, encoding/decoding, modulation/demodulation, and other digital signal processing functions. Memory 220 is typically used to store identification information, and possibly other information, such as account information, identifying information, etc., which can be accessed and possibly updated via command signals received via the control units 205 and 210 and dual-frequency of analog control unit 201.

In some embodiments, access to the memory 220 can be granted based on a security key in accordance with the provision of secure identification solutions for RFID tags as described in U.S. Pat. Nos. 7,081,819, 7,671,746, 8,237,568, 8,322,044, and 8,004,410, the disclosures of which are incorporated by reference herein in their respective entirety.

Memory 220 can store the information needed to implement one or more protocols associated with one or more applications. In certain embodiments, a particular application can be configured to work with command signals sent over one of multiple frequencies received via the radio frequency front end. In other applications, a particular application can be configured to work with command signals received over a single frequency.

One application can be for electronic vehicle registration. In such an application, vehicle registration information can be read from and written to, or updated within the module 100. To read identification information, it is preferable to have a read distance of more than 3 meters, which can be achieved with an UHF interface (e.g., 915 MHz) integrated with the identification module 100. To write or update the vehicle or other information, however, a shorter distance is sufficient, because the write cycle is typically performed only by local authorities in a nearby office. In fact the shorter distance can be preferable for security reasons. Hence, writing information can be achieved with a HF interface (e.g., 13.56 MHz) integrated with the identification module 100. The write cycle, using the HF interface (e.g., 13.56 MHz), can need to be more secure than the read cycle in order to prevent illegal changing of the data.

Figure 3:
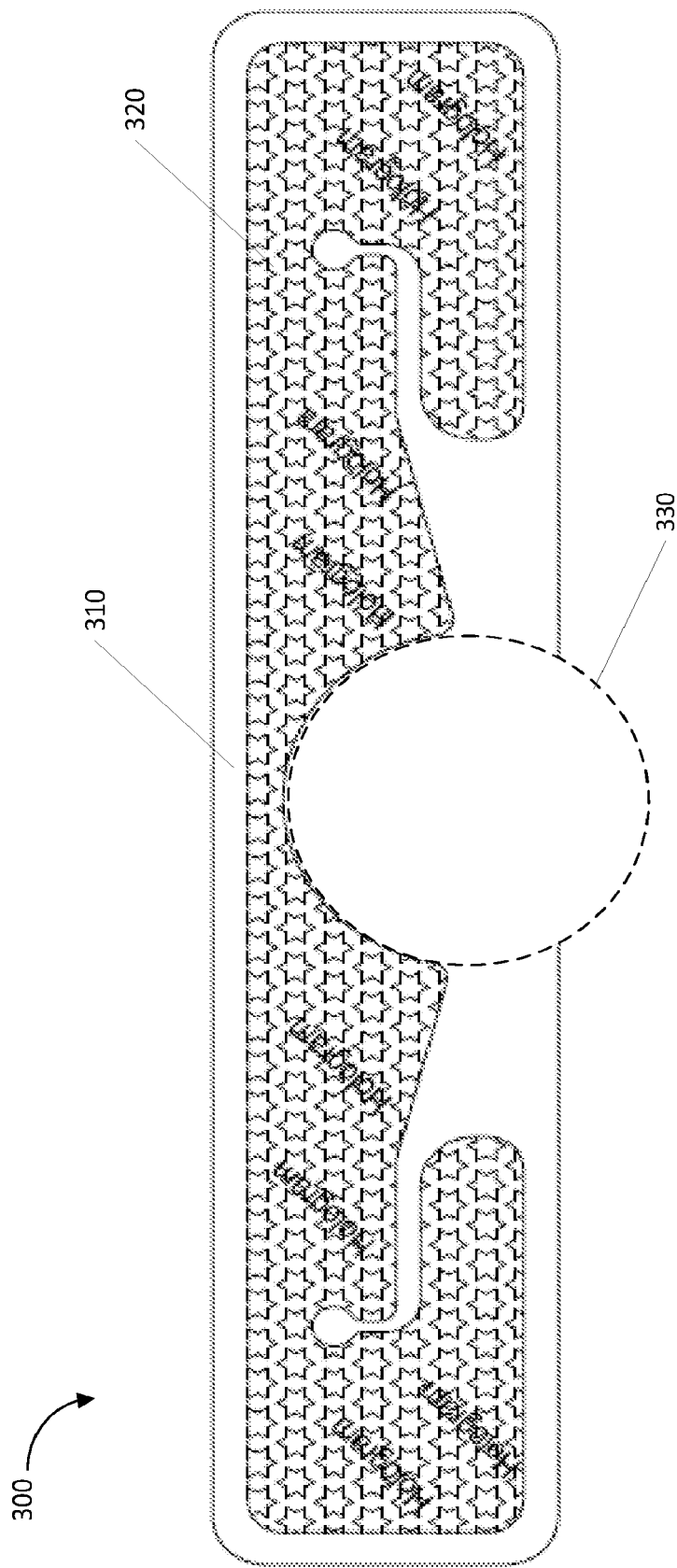
FIG. 3 shows a top-view illustration of an exemplary antenna in accordance with some embodiments described herein.

Because, as explained below, module 100 can be a portable device, it can actually be removed and written remotely from the vehicle with which it is associated. As such, in certain embodiments, a multi-frequency RFID module can include a detachable RFID module 100. For example, FIG. 3 shows a top-view illustration of an exemplary antenna 300 that can, along with, e.g., module 100, form a multi-frequency RFID module in accordance with one embodiment. As can be seen in FIG. 3, antenna 300 can include a substrate 310, an antenna pattern 320, and an aperture 330, which can have a circular shape. In some embodiments, aperture 330 goes through substrate 310. While aperture 330 is shown to have circular shape, other embodiments of antenna 300 can include apertures having shapes other than circular. In various embodiments, antenna 300 can be tuned to operate in an UHF range (e.g., at 915 MHz or 2.45 GHz). In various embodiments, antenna 300 can be configured as a dipole antenna.

In some embodiments, aperture 330 in antenna 300 is configured to receive multi-frequency RFID module 100 described in FIG. 1 (not shown in FIG. 3). In these embodiments, when multi-frequency RFID module 100 is positioned inside aperture 330, antenna 300 can be coupled to chip 110, for example, through the corresponding UHF loop 130. In one embodiment, antenna 300 is inductively coupled to chip 110 via the inductive coupling between antenna 300 and UHF loop 130. In other embodiments, however, antenna 300 can be capacitively coupled to chip 110, or by electrical connection between antenna 300 and UHF loop 130.

In the embodiment shown in FIG. 3, antenna 300 is configured as a hologram antenna that is constructed from a holographic material 320. In specific embodiments, antenna 300 can be a hologram UHF dipole antenna. A holographic antenna 300 can be manufactured using a physical vapor deposition (PVD) technique provided by, for example, Hueck Folien GmbH of Austria.

While FIG. 3 illustrates a holographic antenna, antenna 300 can also be constructed from a mesh of conductor lines or a plurality of conductors (e.g., using poly (3,4-ethylenedioxythiophene) (PEDOT) and indium tin oxide (ITO)). Other materials and methods for creating antenna 300 can be used as appropriate.

Figure 4:
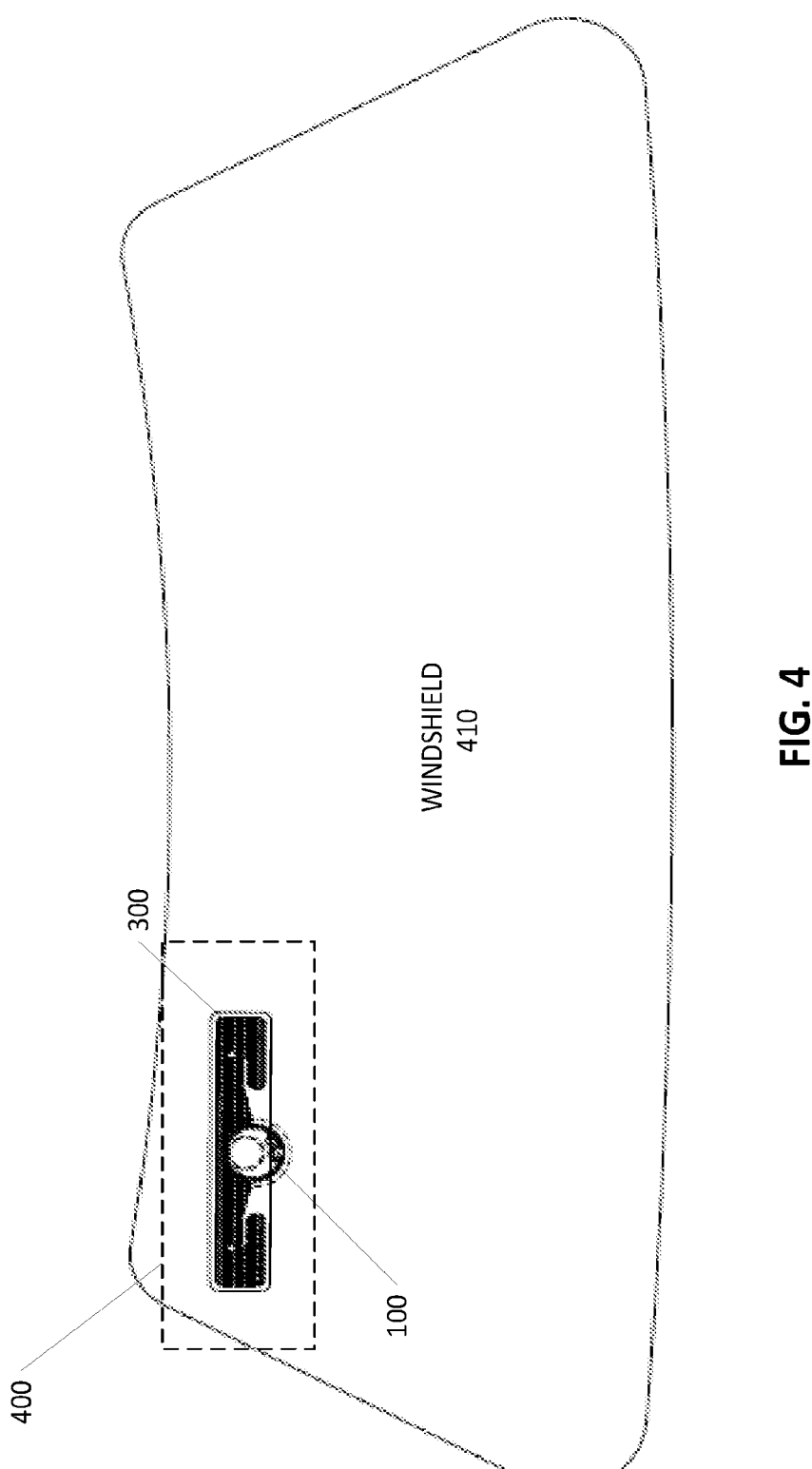
FIG. 4 shows a top-view illustration of an exemplary multi-frequency RFID tag in accordance with some embodiments described herein.

FIG. 4 shows a top-view illustration of an exemplary multi-frequency RFID tag 400 in accordance with some embodiments described herein. In a particular embodiment, multi-frequency RFID tag 400 is formed by combining antenna 300 described in conjunction with FIG. 3 with multi-frequency RFID module 100 described in conjunction with FIG. 1, e.g., by placing multi-frequency RFID module 100 within the aperture of antenna 300. In this embodiment, multi-frequency RFID module 100 in multi-frequency RFID tag 400 includes chip 110, HF coil antenna 120, and UHF loop 130, and chip 110 is coupled to both HF coil antenna 120 and UHF loop 130. Meanwhile, UHF loop 130 is coupled, for example, inductively to antenna 300. As such, chip 110 is also coupled to antenna 300 via UHF loop 130. Hence, if antenna 300 is configured as an UHF antenna, multi-frequency RFID tag 400 can operate both in a HF n frequency mode by way of the system formed by chip 110 and HF coil antenna 120, and in UHF frequency mode by way of the system formed by chip 110 and UHF antenna 300.

According to one exemplary embodiment, removing multi-frequency RFID module 100 from the aperture area of antenna 300 can disable at least some of the functionalities of the multi-frequency RFID tag 400. For example, when antenna 300 is configured as an UHF antenna, removing multi-frequency RFID module 100 from the antenna 300 decouples chip 110 and UHF loop 130 from UHF antenna 300. Consequently, the multi-frequency RFID tag 400, which is missing the IC chip 110, may be unable to operate as an UHF system. This detachable configuration of the multi-frequency RFID tag 400 provides a tamper-proofing mechanism when the multi-frequency RFID tag 400 is likely to be tampered with, for example, when multi-frequency RFID tag 400 is placed on an unintended vehicle. In such situations, the user can simply detach the multi-frequency RFID module 100 from the multi-frequency RFID tag 400 to render the multi-frequency RFID tag 400 inoperable.

According to one exemplary embodiment, the multi-frequency RFID tag 400 can serve as a windshield tag. In the embodiment shown in FIG. 4, the multi-frequency RFID tag 400 is also attached to a vehicle's windshield 410 using, for example, adhesives (e.g., adhesive strips).

Multi-frequency RFID tags are also described in Reissued U.S. Pat. Nos. RE 43,355 and RE 44,691, the disclosures of which are incorporated by reference herein in their respective entirety.

Some applications may require a placement of metallic material (e.g., retro-reflective material, holographic image) over the multi-frequency RFID tag 400. In order to preserve the transmission and reception capabilities of the multi-frequency RFID tag 400, a selective de-metallization process may be employed to treat the metallic material. Selective de-metallization is described in U.S. Pat. Nos. 7,034,688 and 7,463,154, the disclosures of which are incorporated by reference herein in their respective entirety.

According to one exemplary embodiment, the multi-frequency RFID tag 400 can be used to in one or more account management applications. For example, the multi-frequency RFID tag 400 can be used to track a vehicle for purposes of electronic tolling, parking access, and border control. At least some applications for the multi-frequency RFID tag 400 are described in U.S. patent application Ser. No. 14/459,299, now U.S. Pat. No. 9,355,398, the disclosure of which is incorporated herein by reference in its entirety. The '398 patent describes embodiments where one frequency in a dual frequency implementation can be used for, e.g., a tolling application, while the other frequency is used to replenish an account associated with the application.

As noted above, module 100 can be used in a similar manner; however, in addition, module 100 can also be used with multiple applications, e.g., tolling and EVR. Moreover, due to the portable nature of module 100 it can be used in numerous disparate applications. For example, while installed on a windshield, or in a license plate such as described in the '398 application, the module 100 and corresponding tag 400, can be used for tolling and account management as described in the '398, for EVR as described above, or both. But module 100 can be removed from tag 400 and taken with the driver, who can then use, e.g., for access a transportation system, such as bus, subway, train, etc., or some combination thereof.

This can be accomplished by interfacing or inserting module 100 into a substrate, such as an access or identity card. In other embodiments, such a card can actually form module 100. In other words, the driver or user may have a card, or other device, that allows them to access a public transit system, but that can also be interfaced with an antennae affixed, e.g., to a windshield so that the user can use the same card or device for, e.g., tolling. In such an embodiment, the HF, e.g., NFC capabilities can be used in the transit system and the UHF capabilities can be enabled when the device is interfaced with the antenna in the car for, e.g., tolling.

But in other embodiments, the HF function can also be used when the device is interfaced in the car, e.g., for account management or EVR functions as described. Thus, the HF portion would be used for more than one application depending on the setting.

While various examples of the multi-frequency RFID tags described above are based on dual-frequency RFID tags having an HF subsystem and an UHF subsystem, a person having ordinary skill in the art can appreciate that the disclosed multi-frequency RFID tags can have more than two frequency subsystems. For example, the disclosed multi-frequency RFID tags can include three or more frequency subsystems, including three of more of the following: a HF subsystem, a very high frequency (VHF) subsystem, an UHF subsystem, a super high frequency (SHE) subsystem, and an extremely high frequency (EHF) subsystem. Moreover, in the scope of dual-frequency RFID tags, the two frequency modes can be other than just the HF and UHF modes without departing from the scope of the present inventive concept.

The accompanying claims and their equivalents are intended to cover such forms or modifications as would fall within the scope and spirit of the protection. For example, the example apparatuses, methods, and systems disclosed herein can be applied wireless communication devices incorporating HF and/or UHF RFID reader capabilities. The various components illustrated in the figures may be implemented as, for example, but not limited to, software and/or firmware on a processor, ASIC/FPGA/DSP, or dedicated hardware. Also, the features and attributes of the specific example embodiments disclosed above may be combined in different ways to form additional embodiments, all of which fall within the scope of the present disclosure.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in processor-executable instructions that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A multi-frequency radio frequency identification (RFID) tag, comprising:
    a RFID module configured to be physically removed from the RFID tag, the RFID module including,
        an integrated circuit (IC) chip,
        a first antenna coupled to the IC chip and formed of conductive ink, the first antenna being operable in a first frequency range, and
        a coupling antenna coupled to the IC chip; and
    a second antenna formed of conductive ink and communicatively coupled to the IC chip via wireless coupling to the coupling antenna and configured to operate in a second frequency range.

2. The multi-frequency RFID tag of claim 1, wherein the first frequency range comprises a high frequency (HF) range.

3. The multi-frequency RFID tag of claim 1, wherein the second frequency range comprises an ultra-high frequency (UHF) range.

4. The multi-frequency RFID tag of claim 1, wherein the second antenna comprises an aperture configured to receive the detachable RFID module.

5. The multi-frequency RFID tag of claim 4, wherein the first antenna, the second antenna, and the coupling antenna are formed from conductive ink.

6. The multi-frequency RFID tag of claim 1, wherein the second antenna is operable to inductively couple to the IC chip via the coupling antenna.

7. The multi-frequency RFID tag of claim 1, wherein the multi-frequency RFID tag is inoperable in the second frequency range when the detachable RFID module is physically separated from the second antenna.

8. The multi-frequency RFID tag of claim 1, wherein the coupling antenna is disposed within the first antenna on the substrate.

9. The multi-frequency RFID tag of claim 1, wherein the IC chip comprises:
    an analog input unit having a dual-frequency interface module communicatively coupled to the first antenna and the coupling antenna;
    a memory operable to store identification information; and
    a digital control unit communicatively coupled to the analog input unit and the memory.

10. The multi-frequency RFID tag of claim 1, wherein the first antenna comprises a first end and a second end electrically coupled to the chip via dielectric ink and wherein the conductive ink is deposited over the dielectric ink to create a jumper over the dielectric ink to couple the coupling antenna to the chip.

11. A multi-frequency radio frequency identification (RFID) tag comprising:
    a removable chip module, physically removable from the RFID tag, the removable chip module having,
        a substrate,
        a digital control unit,
        a high-frequency (HF) antenna coil printed on the substrate and communicatively coupled to the digital control unit, and
        an ultra-high frequency (UHF) coupling loop electrically coupled to the digital control unit; and
    a UHF antenna communicatively coupled to the digital control unit via inductive coupling to the UHF coupling loop.

12. The multi-frequency RFID tag of claim 11, wherein detaching the removable chip module from the antenna renders the multi-frequency RFID tag inoperable with respect to at least communications via the UHF antenna.

13. The multi-frequency RFID tag of claim 11, wherein the HF antenna coil is tuned to operate in a near field communication (NFC) system.

14. The multi-frequency RFID tag of claim 11, wherein one or more of the HF antenna coil, the UHF coupling loop, and the UHF antenna are formed from conductive ink.

15. The multi-frequency RFID tag of claim 11, wherein the HF antenna coil is positioned inside the UHF coupling loop.

16. The multi-frequency RFID tag of claim 11, wherein the UHF loop is positioned inside the HF antenna coil.

17. A removable multi-frequency radio frequency identification (RFID) module, comprising:
    a substrate;
    an integrated circuit (IC) chip disposed on the substrate;
    a high frequency (HF) antenna electrically coupled to the IC chip and formed of conductive ink on the substrate; and
    a coupling antenna electrically formed of conductive ink and coupled to the IC chip and disposed on the substrate, the coupling antenna being operable to inductively couple the IC chip to a second antenna of an antenna assembly configured to receive the removable multi-frequency RFID module, the second antenna being operable in an ultra-high frequency (UHF) range.

18. The multi-frequency RFID module of claim 17, wherein the coupling antenna is positioned inside the HF antenna.

19. The multi-frequency RFID module of claim 17, wherein the HF antenna is positioned inside the coupling antenna.

20. The multi-frequency RFID tag of claim 17, wherein the IC chip further includes:
   an analog input unit, which further includes a dual-frequency interface module communicative coupled to the HF antenna and the coupling antenna;
   a memory configured to store identification information; and
   a digital control unit coupled between the analog input unit and the memory.

* * * * *

UNITED STATES PATENT AND TRADEMARK OFFICE
CERTIFICATE OF CORRECTION

PATENT NO. : 10,679,115 B2 Page 1 of 1
APPLICATION NO. : 16/365465
DATED : June 9, 2020
INVENTOR(S) : Lauri Johannes Huhtasalo It is certified that error appears in the above-identified patent and that said Letters Patent is hereby corrected as shown below:

In the Specification

Column 8, Line 6, "(SHE)" should be --(SHF)--.

Signed and Sealed this
Twenty-sixth Day of January, 2021

Drew Hirshfeld
*Performing the Functions and Duties of the*
*Under Secretary of Commerce for Intellectual Property and*
*Director of the United States Patent and Trademark Office*